United States Patent [19]

Clark et al.

[11] Patent Number: 5,232,726
[45] Date of Patent: Aug. 3, 1993

[54] ULTRA-HIGH PRESSURE HOMOGENIZATION OF UNPASTEURIZED JUICE

[75] Inventors: Allen V. Clark, Longwood; Theodore R. Rejimbal, Jr., Tangerine; Charles M. Gomez, Ocoee, all of Fla.

[73] Assignee: The Coca-Cola Company, Atlanta, Ga.

[21] Appl. No.: 958,401

[22] Filed: Oct. 8, 1992

[51] Int. Cl.$^5$ ............................................. A23L 2/00
[52] U.S. Cl. ...................................... 426/519; 426/599
[58] Field of Search ................ 426/519, 599; 366/176, 366/192, 337, 340

[56] References Cited

U.S. PATENT DOCUMENTS

| | | | |
|---|---|---|---|
| 2,062,330 | 12/1936 | Page et al. | 99/215 |
| 2,425,689 | 8/1947 | Schwarz | 99/105 |
| 2,539,125 | 1/1951 | Fröding | 99/54 |
| 2,935,407 | 5/1960 | Haman | 99/100 |
| 3,174,506 | 3/1965 | Löliger et al. | 137/563 |
| 3,179,385 | 4/1965 | Deackoff | 259/98 |
| 3,352,693 | 11/1967 | Berk | 99/205 |
| 3,885,057 | 5/1975 | Wander et al. | 426/519 |
| 3,892,877 | 7/1975 | Wagner et al. | 426/365 |
| 4,081,863 | 3/1978 | Rees | 366/176 |
| 4,352,573 | 10/1982 | Pandolfe | 366/176 |
| 4,383,769 | 5/1983 | Pandolfe | 366/337 |
| 4,388,330 | 6/1983 | Wobben et al. | 426/51 |
| 4,463,025 | 7/1984 | Strobel | 426/599 |
| 4,478,855 | 10/1984 | Dahlen et al. | 426/421 |
| 4,497,388 | 2/1985 | Dexter | 181/233 |
| 4,529,606 | 7/1985 | Fustier et al. | 426/330.3 |
| 4,608,266 | 8/1986 | Epperson et al. | 426/599 |
| 4,690,827 | 9/1987 | Kupper et al. | 426/548 |
| 4,695,472 | 9/1987 | Dunn et al. | 426/237 |
| 4,773,833 | 9/1988 | Wilkinson et al. | 417/539 |
| 4,818,555 | 4/1989 | Piotrowski et al. | 426/599 |
| 4,886,574 | 12/1989 | Grant | 159/17.1 |
| 4,889,739 | 12/1989 | Powers et al. | 426/599 |
| 4,938,985 | 7/1990 | Swaine, Jr. et al. | 426/599 |
| 4,946,702 | 8/1990 | Stipp et al. | 426/599 |

OTHER PUBLICATIONS

Pandolfe, W. D., "Development of the New Gaulin Micro-Gap® Homogenizing Valve", vol. 65, *Journal of Dairy Science*, pp. 2035-2044 (1982).

Crandall, P. G., et al. "Viscosity Reduction by Homogenization of Orange Juice Concentrate in a Pilot Plant Taste Evaporator", *Journal of Food Science*, vol. 53, No. 5., pp. 1477-1481.

Lortkipanidze, R. Kh., "Use of a Homogenizer in a Citrus Juice Line", Translated from Russian by the Ralph McElory Co., pp. 1-4.

Berishville, L. I., "The Use of Ultrasound In The Production of Fruit Juices With Pulp", Translated from Russian by the Ralph McElroy Co., pp. 1-4.

Brochure entitled "Innovators In Cell Disruption Technology Introduces The 30CD", *APV Gaulin, Inc.*, 1987.

Pandolfe, William D., "Effect of Dispersed and Continuous Phase Visosity On Droplet Size of Emulsions Generated By Homogenization", vol. 2(4) *J. Dispersion Science and Technology*, pp. 459-474 (1982).

Mizrahi, S. et al., "Ultrasonic Waves in the Concentration of Citrus Juices", *Process Biochemistry*, pp. 25-27 (Oct. 1968).

*Primary Examiner*—George Yeung
*Attorney, Agent, or Firm*—Kenyon & Kenyon

[57] ABSTRACT

Fresh squeezed single-strength citrus juice or other juices are homogenized under an ultra-high pressure of about 15,000 psi. Surprisingly, the ultra-high pressure homogenized juice exhibits an increased shelf life and decreased microbiological activity compared to juice homogenized under conventional pressures. The microbiological activity present in the juice is significantly reduced despite the fact that no pasteurization step is conducted. Single-strength juice processed in this manner maintains good flavor and palatability for 40 days at a storage temperature of 40° F. or lower compared to less than one-half this shelf life for untreated juice.

20 Claims, 1 Drawing Sheet

ULTRA-HIGH PRESSURE HOMOGENIZATION OF UNPASTEURIZED JUICE

BACKGROUND OF THE INVENTION

The present invention relates to a method for extending the shelf life of juices, particularly citrus juice such as orange juice, without pasteurization, by subjecting the juice to an ultra high pressure homogenization step.

Homogenization of orange juice for the purpose of reducing the mean particle size of the pulp and for reducing the viscosity of orange juice concentrate is known in the art (see U.S. Pat. No. 4,946,702). Low viscosity orange juice concentrates are produced by a high shear treatment of concentrate in a high pressure homogenizer. In order to achieve a high shear treatment, commercial homogenizer pressures on the order of 3000 psi to a maximum of 8000 psi are commonly used. In such applications an APV Gaulin Corp. model 15MR homogenizer can be used. Such homogenizers can provide a maximum pressure of about 9500 psi to 10,000 psi.

In the most widely used type of homogenization process, the liquid material such as juice, concentrate or emulsion is introduced at pressures of from 500 psi to 10,000 psi into a central bore within an annular valve seat. (See FIG. 1). The liquid material is forced out through a narrow gap between the valve seat and a valve plate. Upon passing through the gap, the liquid material undergoes extremely rapid acceleration as well as an extreme drop in pressure. This violent action through the valve breaks down globules such as pulp or oils in the juice or the concentrate within the liquid material to produce the homogenized product.

The degree of homogenization is a function of the difference between the pressure of the liquid material at the inlet of the valve and the pressure at the outlet. Commercial homogenizers used for citrus juices have typically been operated at inlet pressures of no greater than 10,000 psi.

As known to those skilled in the art, single-strength orange juice refers to freshly extracted juice having a Brix of about 10.0–12.5. In order to extend the shelf life of single-strength citrus juice a pasteurization step is ordinarily conducted. For orange juice, heating at 185° for 20 seconds is a typical pasteurization condition. However, it would be desirable to simplify processing and eliminate the pasteurization step if the same shelf stability or a commercially acceptable shelf stability could otherwise be achieved. From a practical point of view, there is a perception in the mind of the consumer that an unpasteurized juice is highly desirable and, hence, there may be a marketing advantage to a juice which is more stable than normal unpasteurized juice but has not been heat pasteurized.

It is, therefore, the object of the present invention to provide a method for processing single-strength juice, such as citrus juice, having an extended shelf life which does not require any pasteurization step.

It is a further object of the invention to provide a method for homogenizing orange juice and other juices, which effectively reduces the microbiological activity in the juice thereby contributing to an extension of its shelf life without pasteurization.

SUMMARY OF THE INVENTION

In accordance with the present invention, a juice, such as single-strength orange juice, is homogenized under an ultra-high pressure of about 15,000 psi. Surprisingly, the ultra-high pressure homogenized juice exhibits an increased shelf life and decreased microbiological activity compared to juice homogenized under conventional pressures or to juice which has not been ultra-homogenized. The microbiological activity present in the juice is significantly reduced despite the fact that no pasteurization step is conducted.

DETAILED DESCRIPTION OF THE INVENTION

Figure 1:
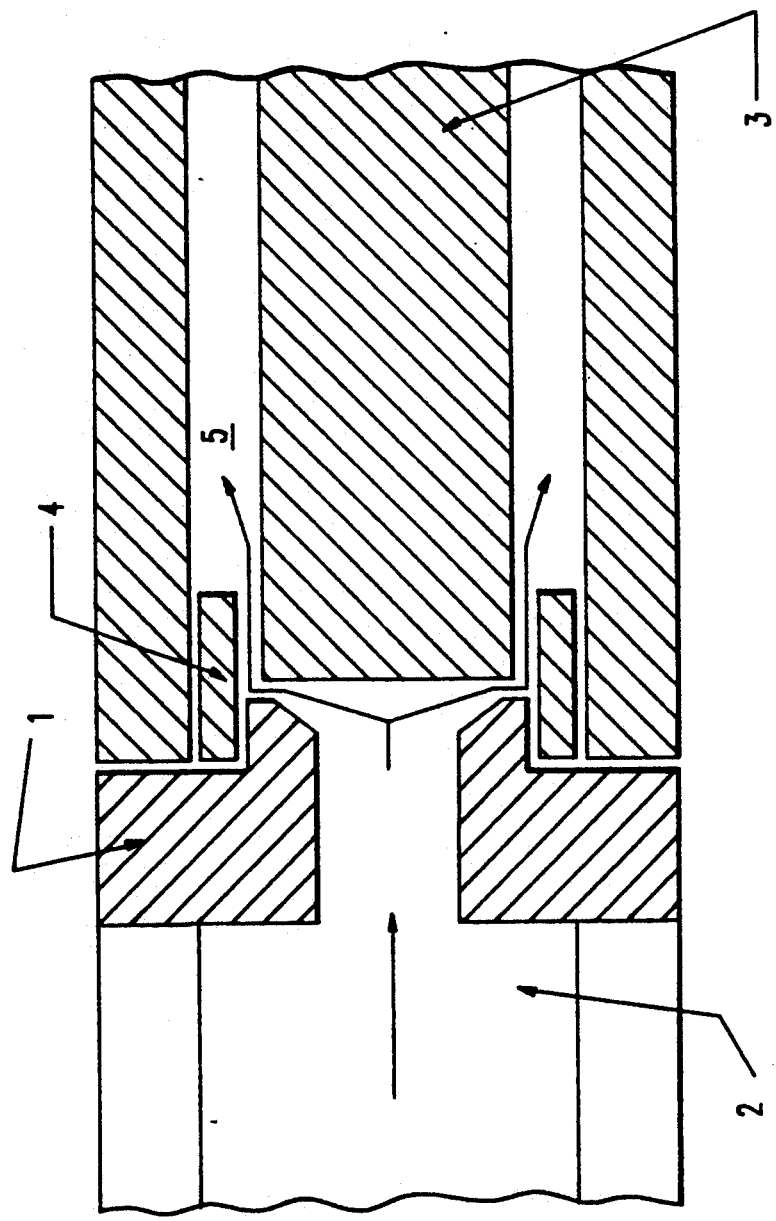

In accordance with the invention, a non-pasteurized juice, such as single-strength orange juice, is homogenized under an ultra-high pressure of about 15,000 psi (1050 bar) or greater. Conventional homogenizers used for processing emulsions, orange concentrate, milk, etc., are unable to achieve such high pressures.

A commercially available homogenizer used for cell disruption in biotechnology applications has been unexpectedly found useful for extending the shelf life of citrus juices and other non-citrus juices. Such success was unexpected because the lower pressure homogenizers did not give this effect and because the fine pulp particles in juice are larger than microorganisms and would be expected to prevent effective cell disruption. It was further realized that this effect was unexpected because enzymes are not inactivated in the process, and enzymes which naturally occur in citrus juices contribute to the instability and short shelf life of unpasteurized citrus juices In this regard, the Model 30CD cell disrupter from APV Gaulin, Inc. is especially designed so as to achieve homogenizing valve inlet pressures of up to 15,000 psi and has been successful in significantly reducing microbial activity in orange juice and extending the shelf life of orange juice. The Model 30CD homogenizer is described in U.S. Pat. No. 4,773,833 to Wilkinson et al. There are larger scale commercially produced models of this homogenizer including Model MC 126-15 RBF1.

Surprisingly, it has been discovered that the shelf life of orange juice is greatly increased if homogenization is conducted under an ultra-high pressure of about 15,000 psi. In addition, micorobial activity is reduced by 99% so that pasteurization of the juice becomes unnecessary.

While not intended to be bound by any theory, it is believed that the high pressure differential between the inlet of the homogenizer valve and the outlet effects a high shear and cavitation which causes cellular disruption of microorganisms in the juice and may alter the size and/or properties of the suspended/insoluble pulp in the juice. It is believed that any conventional homogenizer valve can be used in the practice of the present invention as long as the juice which enters the valve is under a pressure of about 15,000 psi or greater. For example, the conventional homogenizer valve described in U.S. Pat. No. 4,773,833 (col. 5, 1. 9–17) having a valve slit from which fluid can emanate radially outwardly can be used. An important aspect of the present invention is that the citrus juice be directed toward the valve under an ultra-high inlet pressure of about 15,000 psi. Upon exiting the valve through the valve slit the juice experiences a precipitous drop in pressure accompanied by a great increase in velocity. This violent action results in ultra-high shear cavitation and homogenization of the juice.

FIG. 1 is a two-dimensional illustration of a conventional plug type homogenizing valve and the corresponding valve seat. The unhomogenized product enters the valve seat 1 from an inlet conduit 2 at a relatively low velocity but at a high pressure. This pressure is generated by a positive displacement pump (not illustrated) and the restriction to flow caused by the adjustable pushrod 3 being forced against the valve seat 1 by some type of actuating force. The positive displacement pump provides a relatively constant flow and, therefore, will generate the required pressures as the restricted area between the pushrod 3 and valve seat 1 is increased or decreased. The liquid then moves out through the slit area between the pushrod 3 and valve seat 1 at a high velocity, impinges on the splash ring 4, and then is discharged through outlet 5 as homogenized product.

EXAMPLE 1

A comparison study between homogenizer pressures was conducted to investigate the effect of ultra-high pressure homogenization on the shelf life, microbiological activity and pectinesterase (an enzyme) activity of orange juice. Non-pasteurized orange juice was treated with an APV Gaulin Model 30CD cell disrupter and a Model 15MR type homogenizer at pressures of 0, 4000 and 9500 psi. With the Model 30CD, juice was also treated at a pressure of 15,000 psi. The Model 15MR contains a standard industrial 2 stage valve capable of achieving a maximum pressure of 10,000 psi. The initial microbial count for the orange juice samples, before treatment, was 10,700 CFU (colony forming units)/ml.

Chilled orange juice (35° F. to 38° F.) was passed through the homogenizers by means of the pumping action of each homogenizer, thereby avoiding the use of any other piece of pumping equipment. The initial sample was collected with the valves open so that no pressure was being registered by the pressure gauge. Gradually, the valves in the homogenizers were adjusted until the desired pressures (indicated above) were achieved. One minute was allowed for homogenization conditions to become stabilized after which homogenized samples were collected. Twirl-Packs ® were used to collect the juice for microbiological studies, glass bottles were used for collecting samples for sensory analysis. The juice was warmed somewhat during homogenization, but not enough to have a pasteurization effect. During homogenization at the highest pressures, the sample warmed to 78° F. All juice samples were immediately cooled to 40° F. using a tubular heat exchanger after homogenization to remove the heat generated by the homogenization step. Data from the initial test is identified in Example 1 - Table 1.

TABLE 1

EXAMPLE 1
Microbial Activity (CFU/ml) as a Function
of Homogenization Pressure and Storage Time

| Time | Pressure (PSIG) | HOMOGENIZER 30CD (% Reduction) | 15 MR (% Reduction) |
|---|---|---|---|
| Day 0 | 0 (Control) | 9,300 (—) | 10,700 (—) |
|  | 4,000 | 7,400 (20%) | 12,600 (−18%) |
|  | 9,500 | 5,800 (38%) | 9,100 (15%) |
|  | 15,000 | 4,200 (55%) | — |
| Day 7 | 0 (Control) | 1,600 (83%) | 5,000 (53%) |
|  | 4,000 | 200 (98%) | 1,600 (85%) |
|  | 9,500 | 200 (98%) | 1,000 (91%) |
|  | 15,000 | 200 (98%) | — |

As can be seen from the results, there is a significant reduction in microbial activity (as measured by plating on orange serum agar at pH 5.5 [OSA], colony forming units/ml [CFU/ml]) in juice homogenized at 15,000 psi as compared to juice homogenized at lower pressures, on either the CD or conventional (MR) homogenizer. In comparing the runs, it is clear that homogenization at 15,000 psi has a greater effectiveness in the destruction of microorganisms than homogenization at conventional pressures.

The samples were stored at 40° F. to simulate common conditions in the marketplace and in home refrigerators (where product would be stored by consumers). It is common knowledge that colder temperatures (down to the freezing point of about 29° F.) would further contribute to shelf-life extension, while warmer temperatures would decrease shelf life.

After one week of 40° F. storage, the further decrease in microbial activity which had been noted on chilled storage of the samples is more dramatic in the homogenized samples treated with the 30CD cell disrupter design at any pressure, even though microbial activity in both samples during storage at 40° F. Further, the reduction of microbial activity in 40° F. storage was also more rapid in orange juice treated by the 30CD design relative to the 15MR design. As is discussed later in this example, even though initial CFU counts were relatively low in juice processed by either homogenizer, juice processed through the MR15 spoiled more rapidly, based on taste, than did juice processed with the 30CD at 40° F. storage. The results indicate the importance of both homogenizer design and homogenization pressures.

Sensory tests were performed on samples from both homogenizers. No off flavors were found. In all instances, however, a slightly bitter or harsh mouthfeel (likely associated with increased dispersion of the orange oil in the juice) was detected as the only difference compared to the non-homogenized control sample. In tasting all of the samples, it was observed that there existed little difference in this slight harshness between the various homogenized samples. In later tests using lower oil juice samples, less harshness was noted, thereby indicating that this increased oil dispersion would not be a bar to commercial practicality.

The shelf life of non-homogenized unpasteurized juice stored at 40° F. (control) was about 10 days. The shelf life of unpasteurized juice homogenized at 9500 psi was 20 days. The shelf life of the unpasteurized juice was extended to 40 days when a homogenization pressure of 15,000 psi was used. Shelf life was determined by tasting; the shelf life was ended when a significant amount of fermented flavor was detected or when the quality rating score had dropped significantly compared to day zero.

Additional related experiments were carried out in an attempt to better understand this process (Example 1 - Table 2). It was found that pectinesterase activity (PEU) was relatively unaffected by homogenization in either of the homogenizers at the pressures investigated. Similar reductions in microbial counts were noted in these experiments, with the CD homogenizer design being more effective.

TABLE 2

EXAMPLE I
Pectinesterase, Microbiological Activity in Orange Juice as a Function of Homogenization Pressure Comparison of Homogenizers

| | Experiment No. | | | | |
|---|---|---|---|---|---|
| | 1 | 2 | 3 | 4 | 5 |
| | Homogenizer | | | | |
| | 15MR | 30CD | 30CD | 15MR | 30CD |
| Pressure, PSIG | 9,500 | 9,500 | 15,000 | 9,500 | 15,000 |
| Brix | 12.5 | 11.8 | 10.2 | 12.2 | 12.2 |
| Acid, % w/w | 0.74 | 0.94 | 0.82 | 0.6 | 0.6 |
| Ratio | 17.0 | 12.0 | 12.4 | 20.4 | 20.4 |
| Oil, % v/v | 0.026 | 0.026 | 0.019 | 0.010 | 0.010 |
| Pulp, % | — | 10 | 6 | 8 | 8 |
| PEU/ml/min | | | | | |
| Initial | $4.7 \times 10^{-3}$ | $1.4 \times 10^{-3}$ | $2.7 \times 10^{-3}$ | $2.5 \times 10^{-3}$ | $2.5 \times 10^{-3}$ |
| Final | $5.1 \times 10^{-3}$ | $1.5 \times 10^{-4}$ | $2.3 \times 10^{-3}$ | $2.1 \times 10^{-3}$ | $2.1 \times 10^{-3}$ |
| OSA, CFU/ml | | | | | |
| Initial | 8,600 | 66,000 | 5,100 | 10,700 | 10,700 |
| Final | 6,200 | 16,000 | 500 | 1,000 | 200 |
| OSA % Reduction | 28 | 76 | 91 | 86 | 99 |
| Shelf Life Days[1] | — | — | — | 20 | 40 |
| Flow G.P.H. | 15 | 29 | 29 | 15 | 29 |

[1]Storage Temperature: 40° F.

EXAMPLE II

In a separate experiment to confirm the results in Example 1, shelf life (as determined by tasting) showed acceptable flavor and was retained for 20 days after conventional homogenization [9500 psi, the highest practical pressure for the 15MR] (this is essentially the reported shelf life of unprocessed orange juice). (The official rules of the State of Florida Department of Citrus stipulate that unpasteurized juice may not be sold after 17 days from the time of packaging. Chapter 20-64.0081 [5].) Juice processed at 15,000 psi remained palatable for 40 days. High CFU reduction was achieved in both homogenization tests, each of which had very high initial CFU/ml counts. Specific experimental results are listed in the following table. (Example II - Table 1).

TABLE 1

EXAMPLE II
Effect of Homogenization Pressure on Microbiological Activity and Shelf Life

| Homogenizer | 15MR | 30CD |
|---|---|---|
| Pressure, PSIG | 9,500 | 15,000 |
| Brix | 10.36 | 10.36 |
| Acid, % w/w | 0.60 | 0.60 |
| Ratio | 17.26 | 17.26 |
| Oil, % v/v | 0.025 | 0.025 |
| Pulp, % | 8 | 8 |
| OSA, CFU/ml | | |
| Initial | 550,000 | 300,000 |
| Final | 5,100 | 1,500 |
| OSA, % Reduction | 91 | 99 |
| Shelf Life, Days[1] | 20 | 40 |
| Flow G.P.H. | 15 | 29 |

[1]Storage Temperature: 40° F.

EXAMPLE III

Late season single strength Valencia orange juice having a 16.6 ratio and 10% fine pulp was ultra homogenized at 15,000 psi. The juice was stored at 38° F. (3.5° C.) to 40° F. and compared with a non-treated control. Slight fermentation was observed in the non-homogenized sample after 27 days. Tasting of ultra homogenized juice showed the absence of off-flavors after 45 days storage. Flavors which were examined are: harshness, bitterness, fermented flavor, old fruit flavor, and yeasty.

It can be seen that the homogenization of juice under an ultra-high pressure of about 15,000 psi in accordance with the present invention results in a citrus juice product having markedly extended shelf life.

EXAMPLE IV

Clear grape juice at 16.6° Brix was prepared from concentrate and inoculated at $2.7 \times 10^5$ CFU/ml with a culture of *Saccharomyces cerevisia* and then homogenized at 15,000 psig in the CD30 homogenizer under the conditions described in the earlier examples. Initial microbiological counts after homogenization were $2.38 \times 10^4$ (a 91% reduction in microbial activity).

What is claimed is:

1. A method for improving the storage stability and decreasing the microbial activity of citrus juice by homogenization, comprising the step of introducing citrus juice, under a pressure of at least about 15,000 psi, into a homogenizing valve to homogenize the citrus juice.

2. The method according to claim 1 wherein the juice is introduced into the homogenizing valve at a pressure of above 15,000 psi.

3. The method according to claim 2 wherein said valve has a slit and wherein the citrus juice passes through the slit whereupon the juice undergoes a drop in pressure and an increase in velocity.

4. The method according to claim 3 wherein the citrus juice exits from the valve slit in a radially outward direction.

5. The method according to claim 1 further comprising the step of cooling the citrus juice after homogenization to remove heat generated in the juice during the step of homogenizing.

6. The method according to claim 1 wherein the citrus juice is orange juice.

7. The method according to claim 2 wherein the citrus juice is orange juice.

8. The method according to claim 3 wherein the citrus juice is orange juice.

9. The method according to claim 4 wherein the citrus juice is orange juice.

10. The method according to claim 5 wherein the citrus juice is orange juice.

11. The method according to claim 1 further comprising the step of chilling the homogenized juice to a temperature at least as low as 34° F. and storing the juice at said temperature.

12. The method according to claim 2 further comprising the step of chilling the homogenized juice to a temperature at least as low as 34° F. and storing the juice at said temperature.

13. The method according to claim 3 further comprising the step of chilling the homogenized juice to a temperature at least as low as 34° F. and storing the juice at said temperature.

14. The method according to claim 4 further comprising the step of chilling the homogenized juice to a temperature at least as low as 34° F. and storing the juice at said temperature.

15. The method according to claim 6 further comprising the step of chilling the homogenized juice to a temperature at least as low as 34° F. and storing the juice at said temperature.

16. A method for improving the storage stability and decreasing the microbial activity of non-citrus juice by homogenization, comprising the step of introducing non-citrus juice, under a pressure of at least about 15,000 psi, into a homogenizing valve to homogenize the non-citrus juice.

17. The method according to claim 16 wherein said valve has a slit and wherein the non-citrus juice passes through the slit whereupon the juice undergoes a drop in pressure and an increase in velocity.

18. The method according to claim 17 wherein the non-citrus juice exits from the valve slit in a radially outward direction.

19. The method according to claim 16 further comprising the step of chilling the homogenized juice to a temperature at least as low as 34° F. and storing the juice at said temperature.

20. The method according to claim 16 wherein the non-citrus juice is grape juice.

* * * * *